United States Patent
Chang et al.

(10) Patent No.: US 9,994,251 B2
(45) Date of Patent: Jun. 12, 2018

(54) METHOD FOR CONTROLLING OUTPUT OF POWER STEERING SYSTEM

(71) Applicant: Hyundai Motor Company, Seoul (KR)

(72) Inventors: Sehyun Chang, Suwon-si (KR); Byung Rim Lee, Seongnam-si (KR); Minjun Kim, Busan (KR); Youngdae Park, Asan-si (KR); Hyeonseok Cho, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 132 days.

(21) Appl. No.: 14/933,729

(22) Filed: Nov. 5, 2015

(65) Prior Publication Data
US 2016/0368530 A1    Dec. 22, 2016

(30) Foreign Application Priority Data

Jun. 18, 2015    (KR) ........................ 10-2015-0086703

(51) Int. Cl.
*B62D 5/04*    (2006.01)
*B62D 6/00*    (2006.01)

(52) U.S. Cl.
CPC ........... *B62D 5/0463* (2013.01); *B62D 6/008* (2013.01)

(58) Field of Classification Search
CPC .............................. B62D 5/0463; B62D 6/008
See application file for complete search history.

(56) References Cited

U.S. PATENT DOCUMENTS

| | | | | |
|---|---|---|---|---|
| 5,878,360 A * | 3/1999 | Nishino | ............... | B62D 5/0466 180/412 |
| 6,082,482 A * | 7/2000 | Kato | .................... | B62D 5/0466 180/402 |
| 2002/0125063 A1 * | 9/2002 | Kurishige | ............ | B62D 5/0466 180/443 |
| 2007/0144824 A1 * | 6/2007 | Tamaki | ................ | B62D 5/0463 180/446 |
| 2007/0193818 A1 * | 8/2007 | Hidaka | .................. | B62D 5/008 180/421 |
| 2008/0035411 A1 * | 2/2008 | Yamashita | ............. | B62D 5/046 180/443 |
| 2008/0047775 A1 * | 2/2008 | Yamazaki | ............ | B62D 5/0463 180/443 |

(Continued)

FOREIGN PATENT DOCUMENTS

| JP | 2002-200985 A | 7/2002 |
|---|---|---|
| JP | 4404689 B2 | 1/2010 |

(Continued)

OTHER PUBLICATIONS

Machine Translation of KR20150065421.*
Machine Translation JP2005329798.*
Machine Translation JP2002200985.*

*Primary Examiner* — Frederick M Brushaber
(74) *Attorney, Agent, or Firm* — Morgan, Lewis & Bockius LLP

(57) ABSTRACT

A method for controlling an output of a power steering system may include sensing at least one of a driving speed of a vehicle, a steering angle, a steering angular velocity, and a steering torque; obtaining a target steering torque by using at least one of the driving speed, the steering angle, the steering angular velocity, and the steering torque; and determining a motor assist output of the power steering system by using the target steering torque.

5 Claims, 7 Drawing Sheets

(56) References Cited

U.S. PATENT DOCUMENTS

| | | | | |
|---|---|---|---|---|
| 2012/0197493 | A1* | 8/2012 | Fujimoto | B62D 5/0463 |
| | | | | 701/41 |
| 2013/0261898 | A1* | 10/2013 | Fujita | B62D 7/159 |
| | | | | 701/42 |
| 2015/0166100 | A1* | 6/2015 | Kim | B62D 5/0466 |
| | | | | 701/42 |
| 2016/0031478 | A1* | 2/2016 | Shiraki | B62D 5/046 |
| | | | | 701/41 |
| 2016/0368530 | A1* | 12/2016 | Chang | B62D 5/0463 |

FOREIGN PATENT DOCUMENTS

| | | |
|---|---|---|
| KR | 10-2006-0077238 A | 7/2006 |
| KR | 10-2015-0065421 A | 6/2015 |

* cited by examiner

METHOD FOR CONTROLLING OUTPUT OF POWER STEERING SYSTEM

CROSS-REFERENCE TO RELATED APPLICATION

The present application claims priority to and the benefit of Korean Patent Application No. 10-2015-0086703 filed on Jun. 18, 2015, the entire contents of which are incorporated here by reference.

BACKGROUND OF THE INVENTION

Field of the Invention

The present invention relates to a method for controlling output of a power steering system.

Description of Related Art

Currently, a driver recognizes a steering feel by a steering torque transmitted through the steering wheel. Further, the steering torque is determined by a road surface reaction force and a motor assist torque of a motor driven power steering system (MDPS).

The motor assist torque of the MDPS is determined by a sum of assist currents for motor control obtained by a control logic function module for an input signal. However, the control logic function module of the MDPS is determined by tuning of a control element with respect to modules, but function is deteriorated by conflict between them.

For example, since the motor assist torque is increased in the case of friction compensation control but is decreased in the case of damping control, it is hard to control.

Also, since a target steering torque is unclear, there are difficulties for obtaining the motor assist torque although an additional signal such as a road surface reaction force is fed back, and it is hard to determine a motor control amount.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method for controlling output of a power steering system having advantages of controlling the output of a motor driven power steering system according to a driving condition of a vehicle.

An exemplary embodiment of the present invention provides a method for controlling an output of a power steering system, including: sensing at least one of a driving speed of a vehicle, a steering angle, a steering angular velocity, and a steering torque; obtaining a target steering torque by using at least one of the driving speed, the steering angle, the steering angular velocity, and the steering torque; and determining a motor assist output of the power steering system by using the target steering torque.

The step of determining the motor assist output may include obtaining a road surface reaction force of the vehicle, and estimating a frictional force of the power steering system.

The step of determining the motor assist output may further include obtaining the motor assist output by using the target steering torque, the road surface reaction force, and the frictional force.

The step of obtaining the motor assist output may include obtaining a motor assist torque by subtracting the target steering torque from a sum of the road surface reaction force and the frictional force.

The step of obtaining the target steering torque may include calculating the target steering torque by using a three-dimensional steering torque map which is formed by the steering angle, the steering angular velocity, and the steering torque for each driving speed.

The three-dimensional steering torque map may include a steering section and a restoring section divided by using the steering angle and the steering angular velocity.

A value acquired by multiplying the steering angle and the steering angular velocity may be a positive value in the steering section, and the value acquired by multiplying the steering angle and the steering angular velocity may be a negative value in the restoring section.

The method may further include determining the motor assist output by using a remaining steering angle of the steering wheel and a steering angular velocity according to a restoring force of the steering wheel, when a steering wheel is not held by a driver.

According to the present invention for achieving the object, by forming the three-dimensional steering torque map by using the steering angle, the steering angular velocity, and the steering torque, and obtaining the target steering torque depending on the driving condition of the vehicle and determining the motor assist output, it is possible to make the target steering torque of the motor driven power steering system clear and improve a steering feel.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
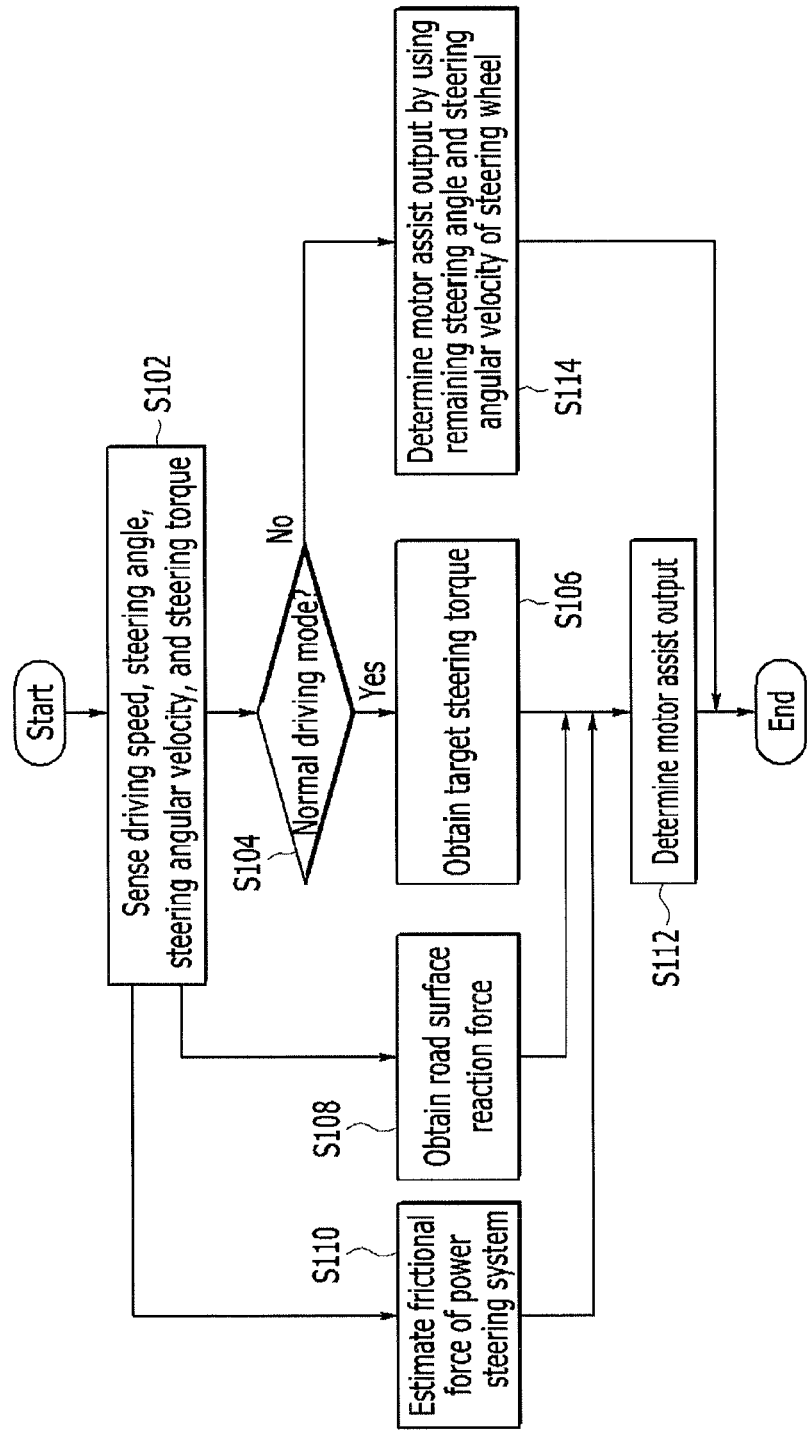
FIG. 1 is a flowchart briefly showing a process of controlling output of a motor driven power steering system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several FIGS. of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

In addition, the terms "-er", "-or", and "module" described in the specification mean units for processing at least one function and operation, and can be implemented by hardware components or software components and combinations thereof.

A method for controlling output of a power steering system according to an exemplary embodiment of the present invention will now be described with reference to FIG. 1 to FIG. 7.

FIG. 1 is a flowchart briefly showing a process of controlling output of a motor driven power steering system according to an exemplary embodiment of the present invention.

Referring to FIG. 1, a motor driven power steering system (MDPS) according to an exemplary embodiment of the present invention senses a driving speed ($V_x$) of a vehicle, a steering angle ($\theta$), a steering angular velocity ($d\theta/dt$), and a steering torque ($T_m$) by using a vehicle sensor at step S102.

The motor driven power steering system including a controller, according to an exemplary embodiment of the present invention detects a driving mode of the vehicle in accordance with whether the steering wheel is held by a driver at step S104. In the motor driven power steering system according to an exemplary embodiment of the present invention, a method for determining a motor assist output may be varied according to the driving mode of the vehicle.

For example, a motor assist output may be determined based on a three-dimensional steering torque map when a driver holds a steering wheel, and the motor assist output may be determined based on stability and a safety when the driver does not hold the steering wheel.

When the steering wheel is held by the driver in a normal driving mode, a target steering torque for controlling a motor of the motor driven power steering system is obtained by using the driving speed, the steering angle, the steering angular velocity, and the steering torque at step S106.

Here, the motor driven power steering system according to an exemplary embodiment of the present invention may form the three-dimensional steering torque map by using the steering angle, the steering angular velocity, and the steering torque for each driving speed, and calculate the target steering torque by using the three-dimensional steering torque map.

In this case, the three-dimensional steering torque map includes a steering section and a restoring section divided by using the steering angle and the steering angular velocity. For example, in the steering section, a value acquired by multiplying the steering angle and the steering angular velocity is a positive value. In the restoring section, the value acquired by multiplying the steering angle and the steering angular velocity is a negative value.

The motor driven power steering system according to an exemplary embodiment of the present invention obtains a road surface reaction force (or a rack force) of the vehicle at step S108. The motor driven power steering system can measure the road surface reaction force at the steering wheel end of the rack by using a load cell sensor. Here, the rack force may be the same as a value obtained by subtracting a frictional force from a sum of a steering torque and a motor assist torque as represented by Equation 1 below.

Rack force=Steering torque+Motor assist torque−
Frictional force  (Equation 1)

Further, the motor driven power steering system according to an exemplary embodiment of the present invention estimates the frictional force of the power steering system at step S110. Here, the frictional force of the power steering system may be the same as a value obtained by subtracting the rack force from a sum of the steering torque and the motor assist torque as represented by Equation 1.

The motor driven power steering system according to an exemplary embodiment of the present invention obtains the motor assist output by using a target steering torque, the road surface reaction force, and the frictional force at step S112.

In this case, the motor driven power steering system according to an exemplary embodiment of the present invention may obtain the motor assist torque by subtracting the target steering torque from a sum of the rack force and the frictional force. In the motor driven power steering system according to an exemplary embodiment of the present invention, the motor assist torque is transformed to a current value depending on the characteristics of the motor, and the current value can be applied to the motor.

When the steering wheel is not held by the driver, the motor assist output can be determined by using a remaining steering angle of the steering wheel and a steering angular velocity according to a restoring force of the steering wheel at step S114.

Here, the remaining steering angle includes an angle of the steering wheel by the frictional force when the steering handle is released, and the steering angular velocity according to the restoring force includes an angular velocity at which the steering wheel returns to an original state by the restoring performance when the steering handle is released.

Figure 2:
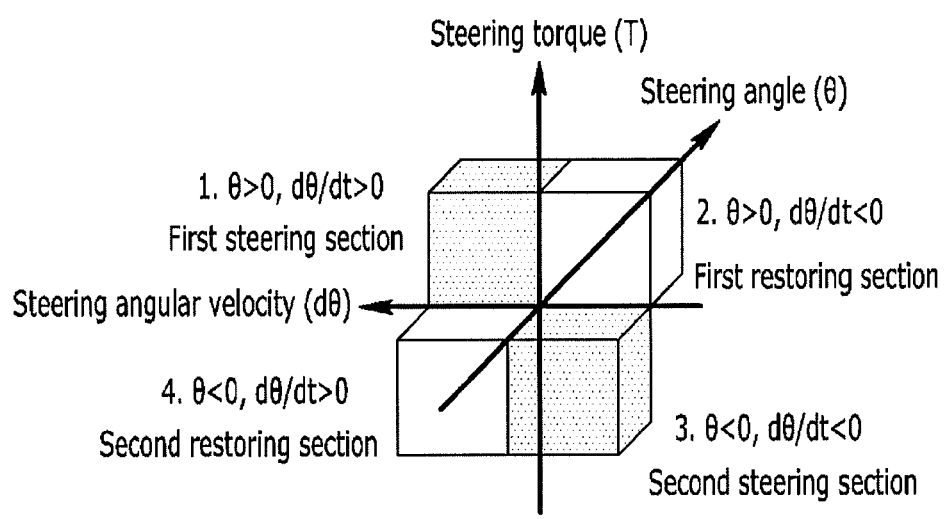
FIG. 2 is a diagram showing a steering section and a restoring section depending on the amplitude of a steering angle and a steering angular velocity according to an exemplary embodiment of the present invention.

FIG. 2 is a diagram showing a steering section and a restoring section depending on the amplitude of a steering angle and a steering angular velocity according to an exemplary embodiment of the present invention.

In the motor driven power steering system according to an exemplary embodiment of the present invention, the three-dimensional steering torque map is formed for each driving speed, and the target steering torque is obtained by using the three-dimensional steering torque map. Such three-dimensional steering torque map may be formed by using the steering angle, the steering angular velocity, and the steering torque for each driving speed.

Further, the three-dimensional steering torque map includes the steering section and the restoring section. In the steering section, a value acquired by multiplying the steering angle and the steering angular velocity is a positive value, and in the restoring section, the value acquired by multiplying the steering angle and the steering angular velocity is a negative value.

Referring to FIG. 2, the steering angle (θ) and the steering angular velocity (dθ/dt) may be positive values in a first steering section, and the steering angle (θ) and the steering angular velocity (dθ/dt) may be negative values in a second steering section. In a first restoring section, the steering angle (θ) may be a positive value and the steering angular velocity (dθ/dt) may be a negative value, and in a second restoring section, the steering angle (θ) may be a negative value and the steering angular velocity (dθ/dt) may be a positive value.

FIG. 3 to FIG. 6 show examples of the steering section or the restoring section according to the steering angle and the steering angular velocity.

Figure 3:
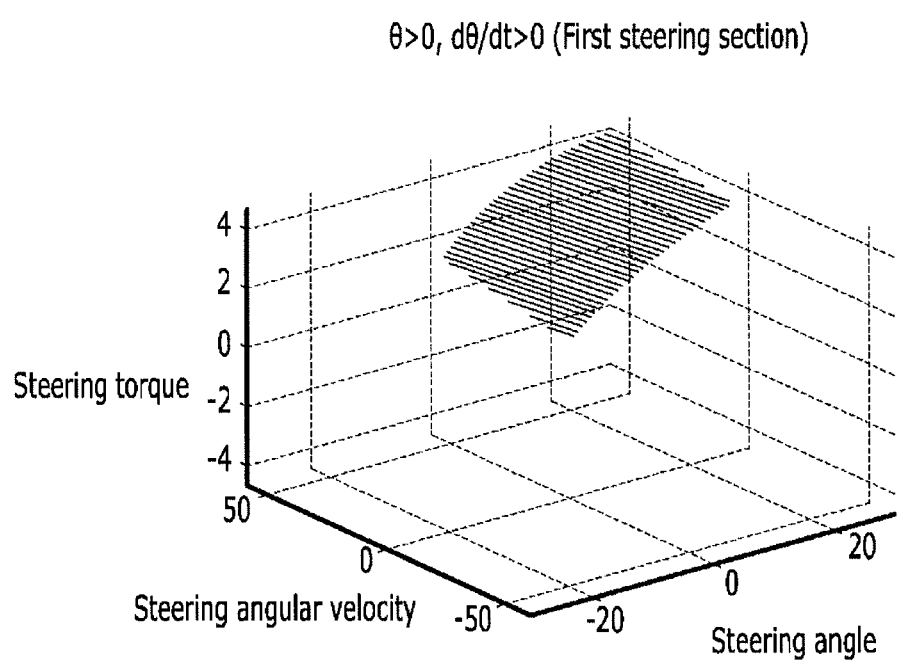
FIG. 3, FIG. 4, FIG. 5 and FIG. 6 show examples of the steering section or the restoring section according to the steering angle and the steering angular velocity.

FIG. 3 is a diagram showing a steering section in which the steering angle and the steering angular velocity are positive values. Here, the steering section of FIG. 3 may correspond to the first steering section of FIG. 2.

Figure 4:
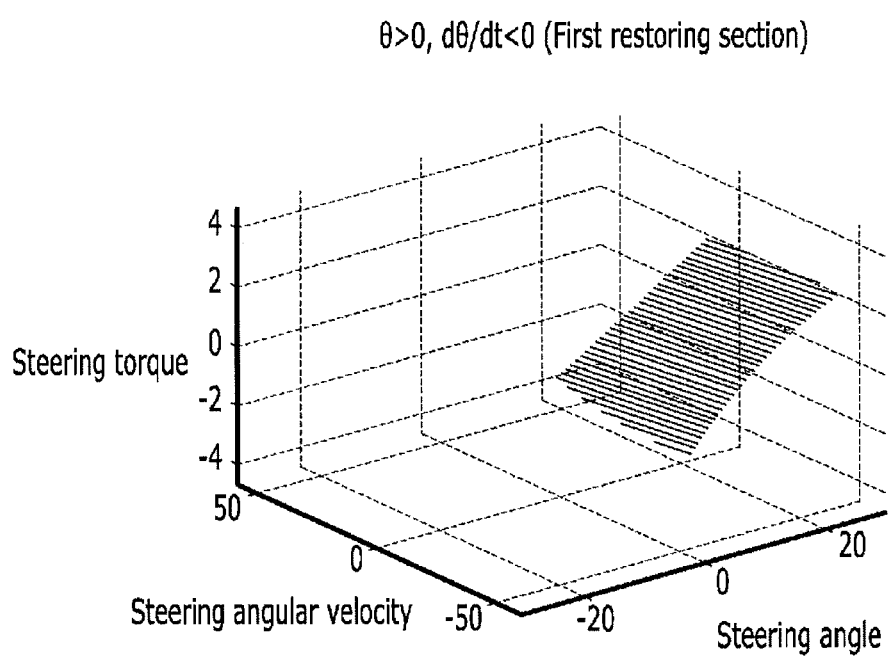

FIG. 4 is a diagram showing a restoring section in which the steering angle is a positive value and the steering angular velocity is a negative value. Here, the restoring section of FIG. 4 may correspond to the first restoring section of FIG. 2.

Figure 5:
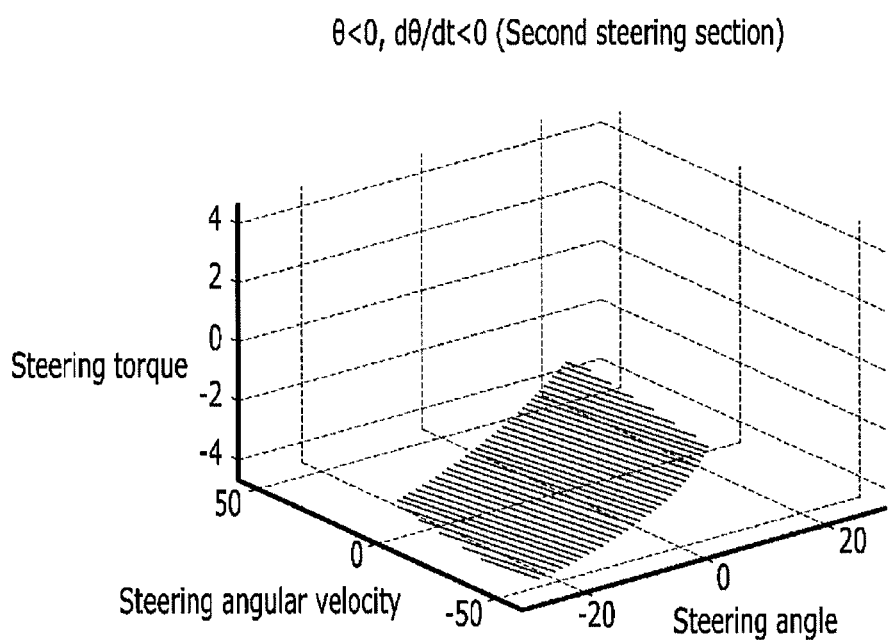

FIG. 5 is a diagram showing a steering section in which the steering angle and the steering angular velocity are negative values. Here, the steering section of FIG. 5 may correspond to the second steering section of FIG. 2.

Figure 6:
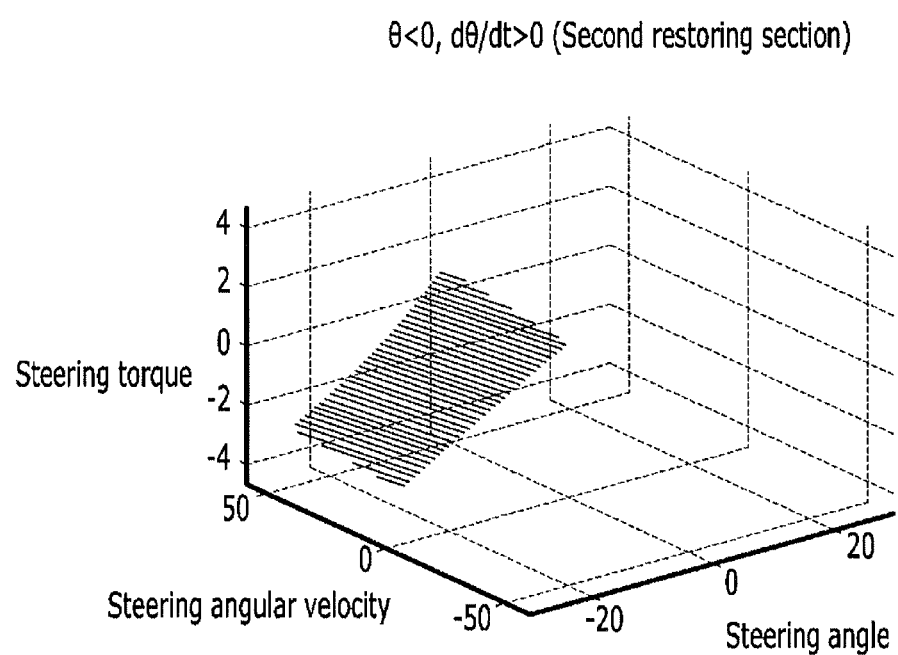

FIG. 6 is a diagram showing a restoring section in which the steering angle is a negative value and the steering angular velocity is a positive value. Here, the restoring section of FIG. 6 may correspond to the second restoring section of FIG. 2.

Figure 7:
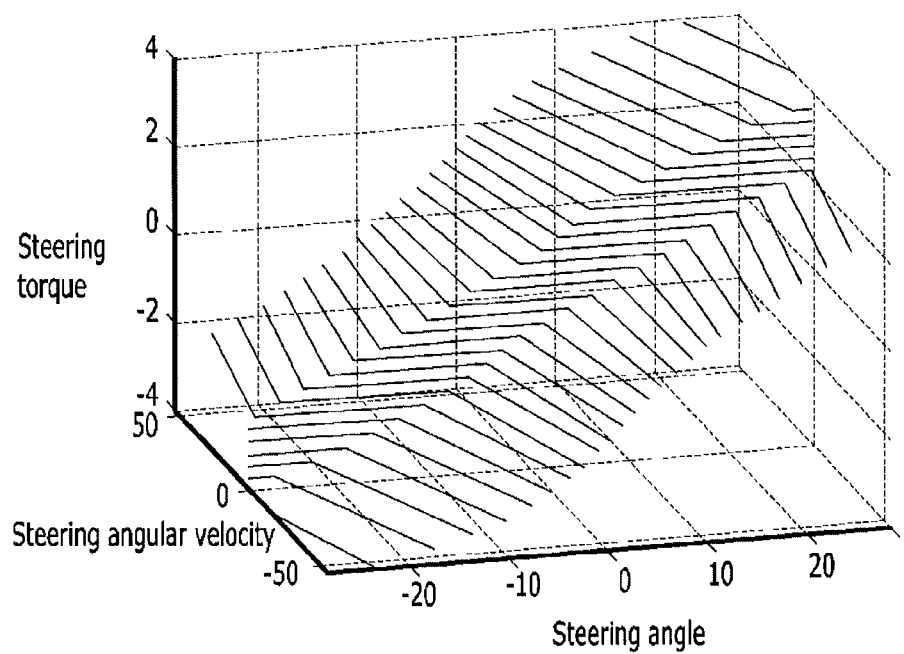
FIG. 7 is a diagram showing a three-dimensional steering torque map formed by using FIG. 3, FIG. 4, FIG. 5 and FIG. 6 according to an exemplary embodiment of the present invention.

FIG. 7 is a diagram showing a three-dimensional steering torque map formed by using FIG. 3 to FIG. 6 according to an exemplary embodiment of the present invention.

The motor driven power steering system according to an exemplary embodiment of the present invention may easily obtain the target steering torque by using the three-dimensional steering torque map of FIG. 7 without requiring a process of complicated calculation.

Further, the three-dimensional steering torque map defined for each driving speed of the vehicle applies a quantified target characteristic curve for the steering torque and the steering angle. The motor driven power steering system according to an exemplary embodiment of the present invention provides a function of a feedback control for the current driving condition by using the three-dimensional steering torque map.

The motor driven power steering system according to an exemplary embodiment of the present invention may also provide a function of a feedforward control in which the steering torque estimated after a few seconds from a current steering angle and a current steering angular velocity is set to the target value.

As described, a method for controlling output of the power steering system according to an exemplary embodiment of the present invention forms the three-dimensional steering torque map by using the steering angle, the steering angular velocity, and the steering torque, obtains the target steering torque depending on the driving condition of the vehicle, and determines the motor assist output. Therefore, it is possible to make the target steering torque of the motor driven power steering system clear and improve a steering feel.

A method for controlling output of the power steering system according to an exemplary embodiment of the present invention is capable of providing strong steering performance by actively reflecting a change of the road surface reaction force.

A method for controlling output of the power steering system according to an exemplary embodiment of the present invention is also capable of simplifying control logics by including the various functions required for controlling the motor driven power steering system in the three-dimensional steering torque map.

The exemplary embodiment of the present invention described above is implemented not only by an apparatus and a method, but also by a program realizing a function corresponding to a configuration of the exemplary embodiment of the present invention or a recording medium recording the program.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling output of a power steering system, comprising:

sensing, by a sensor, at least one of a driving speed of a vehicle, a steering angle, a steering angular velocity, and a steering torque of the power steering system;

obtaining, by a controller, the target steering torque by using at least one of the driving speed, the steering angle, the steering angular velocity, and the steering torque;

determining, by the controller, a motor assist output of the power steering system by using the target steering torque; and controlling, by the controller, the steering torque of the power steering system by applying the motor assist output to the power steering system, wherein the step of obtaining the target steering torque includes: determining the target steering torque by using a three-dimensional steering torque map which is formed by the steering angle, the steering angular velocity, and the steering torque for each driving speed, wherein the three-dimensional steering torque map includes a steering section and a restoring section divided by using the steering angle and the steering angular velocity, wherein a value acquired by multiplying the steering angle and the steering angular velocity is a positive value in the steering section, and wherein a value acquired by multiplying the steering angle and the steering angular velocity is a negative value in the restoring section.

2. The method of claim 1, wherein the step of determining the motor assist output includes:

obtaining a road surface reaction force of the vehicle, and estimating a frictional force of the power steering system.

3. The method of claim 2, wherein the step of determining the motor assist output further includes:
  obtaining the motor assist output by using the target steering torque, the road surface reaction force, and the frictional force.

4. The method of claim 3, wherein the step of obtaining the motor assist output includes:
  obtaining a motor assist torque by subtracting the target steering torque from a sum of the road surface reaction force and the frictional force.

5. The method of claim 1, further comprising:
  determining the motor assist output by using a remaining steering angle of a steering wheel and a steering angular velocity according to a restoring force of the steering wheel, when the steering wheel is not held by a driver.

* * * * *